(12) United States Patent
Rosochacki et al.

(10) Patent No.: US 7,367,914 B2
(45) Date of Patent: May 6, 2008

(54) DIFFERENTIAL HOUSING SUPPORT MEMBER

(75) Inventors: Mike Rosochacki, Canton, MI (US); Brian Nosakowski, Macomb, MI (US)

(73) Assignee: Ronjo Company, Orion, MI (US)

( * ) Notice: Subject to any disclaimer, the term of this patent is extended or adjusted under 35 U.S.C. 154(b) by 210 days.

(21) Appl. No.: 11/363,434

(22) Filed: Feb. 27, 2006

(65) Prior Publication Data

US 2006/0276296 A1    Dec. 7, 2006

Related U.S. Application Data

(60) Provisional application No. 60/656,363, filed on Feb. 25, 2005.

(51) Int. Cl.
*F16H 48/06* (2006.01)
*B21D 53/28* (2006.01)

(52) U.S. Cl. .................................. 475/230; 29/893.1

(58) Field of Classification Search ................ 475/220, 475/230; 74/606 R, 607; 29/893.1, 893.2
See application file for complete search history.

(56) References Cited

U.S. PATENT DOCUMENTS

| | | |
|---|---|---|
| 3,679,244 A | 7/1972 | Reddy |
| 4,125,026 A | 11/1978 | Torii et al. |
| 4,183,263 A | 1/1980 | Osenbaugh |
| 4,221,138 A | 9/1980 | Stewart et al. |
| 4,262,766 A | 4/1981 | Brown et al. |
| 4,305,313 A | 12/1981 | Konkle |
| 4,630,506 A | 12/1986 | Allmandinger et al. |
| 4,644,818 A | 2/1987 | Choma et al. |
| 4,722,244 A | 2/1988 | Tsuchiya et al. |
| 4,787,267 A | 11/1988 | Kessler et al. |
| 5,271,294 A | 12/1993 | Osenbaugh |
| 5,286,239 A | 2/1994 | Ito et al. |
| 5,647,814 A | 7/1997 | Krisher |
| 5,706,694 A | 1/1998 | Bhookmohan et al. |
| 5,715,918 A | 2/1998 | Everett et al. |
| 5,938,558 A | 8/1999 | Eybergen et al. |
| 5,980,416 A | 11/1999 | Gafvert |
| 5,980,417 A | 11/1999 | Wopshall |
| 5,987,728 A | 11/1999 | Townsend |
| 6,010,424 A | 1/2000 | Irwin |
| 6,045,479 A | 4/2000 | Victoria et al. |
| 6,053,838 A | 4/2000 | Gage |
| 6,058,805 A | 5/2000 | Merkler |

(Continued)

FOREIGN PATENT DOCUMENTS

CA    2 508 768 A1    6/2005

(Continued)

*Primary Examiner*—Dirk Wright
(74) *Attorney, Agent, or Firm*—Howard & Howard Attorneys, P.C.

(57) ABSTRACT

The present invention discloses a differential housing and a method operable to form the differential housing. The method includes the step of disposing a member having an outer surface on a mandrel. The member in the exemplary embodiment of the invention is a ring that enhances the strength of the finished differential housing. The method also includes the step of cold-working a housing preform by flow-forming the inner surface of the housing preform into conformance with the mandrel and with the outer surface of the member after said disposing step. The member is disposed in situ as the housing preform is cold-worked to produce the finished differential housing.

46 Claims, 2 Drawing Sheets

U.S. PATENT DOCUMENTS

| | | | |
|---|---|---|---|
| 6,061,907 A | 5/2000 | Victoria et al. |
| 6,068,571 A | 5/2000 | Irwin |
| 6,146,304 A | 11/2000 | Bendtsen |
| 6,176,152 B1 | 1/2001 | Victoria et al. |
| 6,196,942 B1 | 3/2001 | Peterson et al. |
| 6,210,299 B1 | 4/2001 | Yoshioka |
| 6,256,988 B1 | 7/2001 | Hauser et al. |
| 6,325,737 B1 | 12/2001 | Zinke et al. |
| 6,379,277 B1 | 4/2002 | Victoria et al. |
| 6,497,027 B1 | 12/2002 | Irwin |
| 6,589,671 B1 | 7/2003 | Kehrer |
| 6,616,565 B1 | 9/2003 | Chen |
| 6,623,396 B2 | 9/2003 | Szalony et al. |
| 6,623,867 B2 | 9/2003 | Crocco et al. |
| 6,645,113 B2 | 11/2003 | Orr et al. |
| 6,652,408 B2 | 11/2003 | Rutt et al. |
| 6,692,398 B1 | 2/2004 | Sullivan |
| 6,699,154 B2 | 3/2004 | Orr et al. |
| 6,702,707 B2 | 3/2004 | Krzesicki et al. |
| 6,945,898 B2 | 9/2005 | Szuba |
| 6,957,918 B2 | 10/2005 | Beutler |
| 2003/0119621 A1 | 6/2003 | Orr et al. |
| 2003/0144108 A1 | 7/2003 | Krzesicki et al. |
| 2004/0060384 A1 | 4/2004 | Guo |
| 2004/0116235 A1 | 6/2004 | Szuba |
| 2005/0103557 A1 | 5/2005 | Duncan |

FOREIGN PATENT DOCUMENTS

| | | |
|---|---|---|
| EP | 0 321 435 A2 | 6/1989 |
| EP | 0 343 146 A2 | 11/1989 |
| WO | WO 02/28678 A1 | 4/2002 |
| WO | WO 2004/053357 A1 | 6/2004 |

DIFFERENTIAL HOUSING SUPPORT MEMBER

CROSS-REFERENCE TO RELATED APPLICATIONS

This application claims the benefit of a provisional application Ser. No. 60/656,363 filed on Feb. 25, 2005.

FIELD OF THE INVENTION

The invention relates to automotive driveline application and in particular to a flow-formed differential housing for retaining a differential mechanism, which transmits torque from a transmission of a vehicle to axle shafts of the vehicle and a method of forming the flow-formed differential housing.

BACKGROUND OF THE INVENTION

A differential housing supports a differential mechanism having gears that transmit torque from a transmission of a vehicle to axle shafts of the vehicle. Generally, bevels gears of the differential mechanism are housed in the differential housing. Alternatively, planetary gears can also be housed in the differential housing. The typical differential mechanism of the vehicle transmission is designed to transmit torque from a transmission output to opposing axle shafts of the differential mechanism allowing right and left wheels to rotate at different speeds, particularly important when negotiating a turn. While performing generally the same function, the differential mechanism has different dimensional requirements for rear wheel and front wheel drive vehicles. Specifically, differentials intended for use on the front wheel drive vehicles require a beveled, and even annular shape in order to compensate for both the smaller packaging area available and to account for the steering characteristics of the front wheels of the vehicle.

The art is replete with various methods of forming the aforementioned differential housings. The differential housings can be formed from a single casting that is machined subsequent to casting. The casting process enhances the control of wall thickness but produces a relatively heavy finished part. An continuing goal of vehicle manufacturers is to reduce the weight of each component of the vehicle. Flow forming is a process that can produce relatively lighter finished parts, but is limited with respect to the control of wall thickness. U.S. Pat. No. 6,061,907 to Victoria et al. discloses a method for forming a two-piece differential housing using a cold flow-forming process. In particular, a housing portion is formed in a series of steps starting with a cup-shaped workpiece. The cup-shaped workpiece is fitted over a mandrel and flow-formed into a housing preform. Surface finishing is performed during the flow-forming process. Flow-formed differential housings can sometimes be compromised by sections of thin walls. These thin wall sections diminish the durability of the differential housing.

There is a constant need in the area of differential housings for an improved design of the differential housing formed by the cold flow-forming process that improves durability characteristics of the differential housing.

SUMMARY OF INVENTION

A differential housing for a differential mechanism of the present invention includes an annular wall circumscribing an axis for retaining the differential mechanism. A tubular member extends between the annular wall and the differential mechanism. The tubular member partially encapsulates the differential mechanism to distribute a pressure received from the differential mechanism evenly about the annular wall. The annular wall is partially deformed into the tubular member thereby forming a mechanical connection between the tubular member and the annular wall with the tubular member being immovably associated with the annular wall through the mechanical connection.

A method of the present invention is operable to form the aforementioned differential housing. The method includes the step of disposing the tubular member having the outer surface on a mandrel. The tubular member in the exemplary embodiment of the inventive method is a ring that enhances the strength of the finished differential housing. The method also includes the step of cold-working the annular wall, i.e. a housing preform, by flow-forming the annular wall into conformance with the mandrel and with the outer surface of the tubular member after said disposing step. The tubular member is disposed in situ as the housing preform is cold-worked to produce the finished differential housing.

One of the advantages of the present invention provides for an improved design of the differential housing that overcomes the problems associated with previously known differential housings by improving durability characteristics of the differential housing.

Another advantage of the present invention provides for an improved design of the differential housing that enhances the strength of the differential housing by increasing the wall thickness at a high-stress location.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
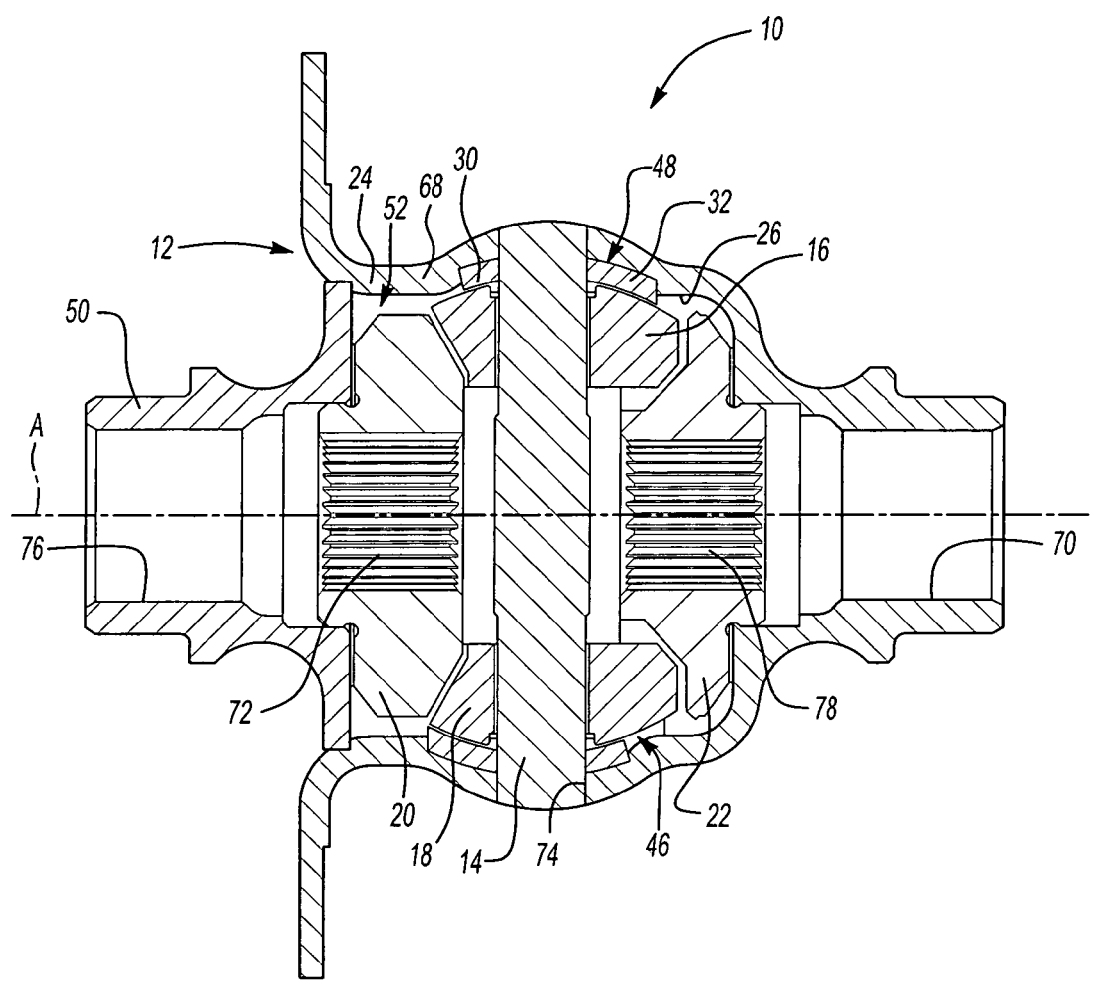
FIG. 1 is a cross-sectional view of a finished differential housing according to an exemplary embodiment of the present invention.
Figure 2:
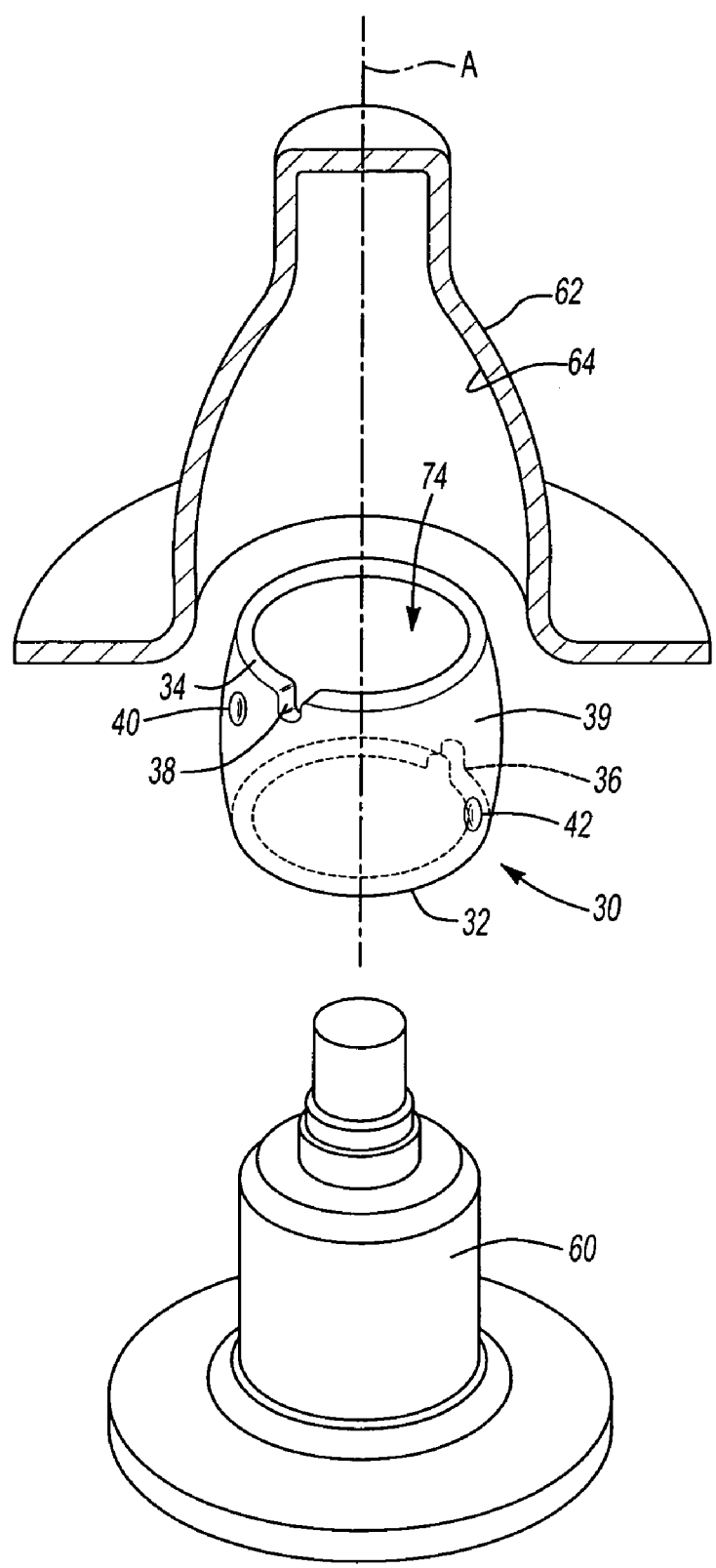
FIG. 2 is an exploded view relating to the method of manufacturing the finished differential housing according to the exemplary embodiment of the present invention.

Referring now to FIGS. 1 and 2, a differential assembly, generally shown at 10 of the present invention is designed for supporting a differential mechanism retained by a differential housing, generally shown at 12. The differential mechanism is retained by the differential housing 12 and includes a pin 14 disposed in the differential housing 12, a pair of beveled gears 16, 18 supported by the pin 14, a pair of pinion or side gears 20, 22 presenting meshing or driving engagement with the beveled gears 16, 18 for transmitting torque from a transmission of a vehicle (not shown) to axle shafts (not shown) of the vehicle. The differential housing 12 is defined by an annular wall 24 exposed to inner surface 26 circumscribing an axis A for retaining the differential mechanism.

A tubular member, generally shown at 30 in FIG. 2 extends between the annular wall 24 and the differential mechanism to partially encapsulate the differential mechanism. The tubular member 30 present spherical configuration and is truncated to two opposite sides, such as, for example, a first axial side 32 and a second axial side 34. The tubular member 30 receives pressure from the differential mechanism, in particular from the pin 14 and the beveled gears 16, 18, and distributes the evenly about the annular wall 24. The annular wall 24 and the tubular member are mechanically interconnected one with another. Preferably, the annular wall 24 is partially deformed into the tubular member 30 with the tubular member 30 being immovably associated with the annular wall 24 to prevent axial movement of the tubular member 30 relative the annular wall 24.

Alluding to the above, the mechanical connection is further defined by at least one radial discontinuity defined by a first notch, which is shown in phantom at 36 on the first axial side 32 of the tubular member 30. The mechanical connection is further defined by at least one radial discontinuity defined by a second notch 38 formed on the second axial side 34. Alternatively, the mechanical connection may include dimples 40, 42 or depressions defined in the outer surface 39 of the tubular member 30. The dimples 40, 42 and/or the notches 36, 38 may include different configurations and are not intended to limit the scope of the present invention. Material from the housing preform 23 can be urged into the dimples 40, 42 during the flow forming process.

The first notch 36 and the second notch 38 are radially spaced 180 degrees from one another and extend axially away from one another. As will be discussed further below in details at least one portion, generally indicated at 46 of the annular wall 24 is deformed into at least one of the notches 36, 38 to mechanically interconnect the tubular member 30 with the annular wall 24. A seat, generally indicated at 48, is defined in the annular wall 24. The seat 48 presents a configuration complementary to the shape of the tubular member 30 to engage the tubular member 30 and prevent axial movement of the tubular member 30 relative the annular wall 24. A lid 50 is attached to the annular wall 24 thereby forming an enclosure, generally indicated at 52, within the annular wall 24 for retaining the differential mechanism.

Alluding to the above, a method of the present invention includes the steps of disposing the tubular member 30 on a mandrel 60 and cold-working a housing preform 62 defining an inner surface 64 by flow-forming the inner surface 64 of the housing preform 62 into conformance with the mandrel 60 and the outer surface 39 of the tubular member 30 after the disposing step. In operation of the exemplary embodiment of the invention, the tubular member 30 is received by the mandrel 60, the mandrel 60 is inserted in an aperture 66 defined by the tubular member 30, and the housing preform 62 is placed over the mandrel 60 and the tubular member 30. A flow-forming tool, similar to the tooling described and shown in the U.S. Pat. No. 6,061,907 to Victoria et al., works the housing preform 62 to produce an otherwise finished differential housing 12. The U.S. Pat. No. 6,061,907 to Victoria et al., is hereby incorporated by reference to the present application. Supplementary operations such drilling or surface finishing can be performed on the housing 12 after the flow-forming process.

Alluding to the above, the cold-working step of the method of the invention can also be defined as forming the annular wall 24 or the housing from the housing preform 62 with the tubular member 30 disposed in situ with respect to the annular wall 24. The flow-forming process is performed on the housing preform 62 while the housing preform 62 covers or encloses the tubular member 30. After the flow-forming process, the housing preform 62 can be considered as substantially finished housing 12 with the tubular member 30 fixed relative to the substantially finished housing 12.

The method of the invention can also include the step of forming at least one radial discontinuity defined by the first notch 36 on the outer surface 39 of the tubular member 30 before the cold-working step. At any point along the axis A of the tubular member 30, the outer surface 39 defines a circle in a plane transverse to the axis A. Alluding to the above, the radial discontinuity or the first notch 36 is a portion of the outer surface 39 that breaks the circular shape of the outer surface 39 in a plane transverse to the axis A. The cold-working step of the method of the invention can also include the step of urging the portion of the housing preform 62 into the at least one of the first notch 36 and the second notch 38.

During the flow-forming process, material of the housing preform 62 is moved or shift as desired. Movement of the material of the housing preform 62 can be desired to increase the thickness 68 of the annular wall 24 in particular portions of the finished housing 12. In the exemplary embodiment of the invention, material of the housing preform 62 is moved or urged by tooling to occupy the space defined by the first radial discontinuity or the first notch 36. As a result, the tubular member 30 is fixedly associated with housing 12 after the flow forming process. The forming of the radial discontinuity step of the method of the invention can also include the step of disposing the first radial discontinuity or the first notch 36 on the first axial side of the tubular member 30 and the second radial discontinuity or the second notch 38 on the second axial side of the tubular member 30. The tubular member 30 can have as many radial discontinuities as desired. The otherwise smooth outer surface 39 of the tubular member 30 can define numerous radial discontinuities, appearing non-smooth. As the number of radial discontinuities increases, movement between the tubular member 30 and the housing preform 62 is less likely.

Corresponding portions of the housing preform 62 are urged into each radial discontinuity or the first and second notches 36, 38, respectively, during the flow-forming process. In the exemplary embodiment of the invention, the tubular member 30 is substantially spherical and truncated on opposite sides 32, 34. Also, the first and second notches 36, 38 extend axially away from one another. At least one portion 46 of the housing preform 62 is disposed in at least one of the first and second notches 36, 38. In alternative embodiments of the invention, the radial discontinuities are formed as one or more dimples, such as dimples 40, 42.

As a result, the tubular member 30 would be immovably associated with the finished housing 12 after the flow forming process. In the exemplary embodiment of the invention, the finished housing 12 is assembled to other components to form the inventive differential assembly 10. After the finished housing 12 has been formed from the housing preform 62 with the tubular member 30 disposed in situ, a longitudinal aperture 70 is formed and finished. The longitudinal aperture 70 receives one of the axle shafts (not shown), which defines splines thereby matingly engaging splines 72 defined by the gear 20. Also, a transverse aperture 74 is formed and finished. The transverse aperture 74 passes through the finished housing 12 and the tubular member 30. The pin 14 is received in the transverse aperture 74. The lid 50 is fixedly associated with the finished housing 12 after the gears 16, 18, 20, 22 have been assembled. The lid 50 defines a second longitudinal aperture 76 which receives one of the axle shafts. The other axle shaft (not shown) extends through defines splines which matingly engage splines 78 defined by the gear 22.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A differential housing for a differential mechanism comprising;
   an annular wall circumscribing an axis for retaining the differential mechanism; and
   a tubular member extending between said annular wall and the differential mechanism and partially encapsulating the differential mechanism for distributing pressure received from the differential mechanism about said annular wall with said with annular wall being partially deformed into said tubular member to define a mechanical connection therebetween.

2. A differential housing as set forth in claim 1 wherein said tubular member is immovably associated with said annular wall through said mechanical connection.

3. A differential housing as set forth in claim 2 wherein said tubular member has an outer surface being cold-worked by flow-forming into conformance with said annular wall.

4. A differential housing as set forth in claim 3 wherein said mechanical connection is further defined by at least one radial discontinuity on said outer surface of said tubular member.

5. A differential housing as set forth in claim 4 wherein said mechanical connection is further defined by at least one portion of said annular wall being deformed into said at least one radial discontinuity.

6. A differential housing as set forth in claim 5 wherein said at least one radial discontinuity is a depression defined in said outer surface.

7. A differential housing as set forth in claim 6 wherein said tubular member is spherical.

8. A differential housing as set forth in claim 7 wherein said spherical member is truncated on opposite sides.

9. A differential housing as set forth in claim 8 wherein said at least one radial discontinuity is further defined a first notch adjacent to one of said truncated sides and a second notch adjacent to the other of said truncated sides.

10. A differential housing as set forth in claim 9 wherein said first notch and said second notch are radially spaced from one another.

11. A differential housing as set forth in claim 10 wherein said first notch and said second notch are radially spaced 180 degrees from one another.

12. A differential housing as set forth in claim 11 wherein said first notch and said second notch extend axially away from one another.

13. A differential housing as set forth in claim 11 wherein said at least one portion of said annular wall is disposed in both of said first notch and said second notch.

14. A differential housing as set forth in claim 13 wherein said outer surface of said tubular member is smooth and adjacent to said first notch and said second notch.

15. A differential housing as set forth in claim 14 wherein said annular wall includes a seat defined therein to engage said tubular member and prevent axial movement of said tubular member relative said annular wall.

16. A differential housing as set forth in claim 1 including a lid attached to said annular wall thereby forming an enclosure within said annular wall for retaining the differential mechanism.

17. A method for forming a differential housing comprising the steps of:
    disposing a member having an outer surface on a mandrel;
    positioning a housing preform having an inner surface over the member and the mandrel; and
    cold-working the housing preform by flow-forming the inner surface into conformance with the mandrel and the outer surface after said disposing step, thereby strengthening the differential housing proximate the member.

18. The method of claim 17 wherein said cold-working step is further defined as forming a housing from the housing preform with the member disposed in situ with respect to the housing.

19. The method of claim 18 further comprising the step of:
    forming at least one radial discontinuity on the outer surface of the member before said cold-working step.

20. The method of claim 19 wherein said step of cold-working includes the step of:
    urging at least one portion of the housing preform into the at least one radial discontinuity on the outer surface of the member.

21. The method of claim 20 wherein said step of forming at least one radial discontinuity includes the step of:
    disposing a first radial discontinuity on a first side of the member and a second radial discontinuity on a second side of the member.

22. A differential housing manufactured by cold-working a housing preform having an inner surface by flow-forming the inner surface of the housing preform with a mandrel, said differential housing comprising:
    a member having an outer surface; and
    a housing preform having an inner surface and being immovably associated with said member, said housing preform being cold-worked by flow-forming said inner surface into conformance said outer surface of said member thereby strengthening said differential housing.

23. The differential housing of claim 22 wherein said member includes:
    at least one radial discontinuity on the outer surface of said member.

24. The differential housing of claim 23 wherein at least one portion of said housing preform is disposed in said at least one radial discontinuity.

25. A differential housing comprising;
    a member having an outer surface and being disposed on a mandrel; and
    a housing preform having an inner surface and being cold-worked by flow-forming said inner surface into conformance with the mandrel and said outer surface of said member thereby interlocking said housing preform with said member thereby strengthening said differential housing.

26. The differential housing of claim 25 wherein said member is spherical.

27. The differential housing of claim 26 wherein said spherical member is truncated on opposite sides.

28. The differential housing of claim 27 wherein said spherical member is hollow.

29. The differential housing of claim 28 wherein said spherical member includes at least one radial discontinuity on said outer surface.

30. The differential housing of claim 29 wherein said at least one radial discontinuity is a depression in said outer surface.

31. The differential housing of claim 30 wherein said at least one radial discontinuity includes a first notch adjacent to one of said truncated sides and a second notch adjacent to the other of said truncated sides.

32. The differential housing of claim 31 wherein said first and second notches are radially spaced from one another.

33. The differential housing of claim 32 wherein said first and second notches are radially spaced 180 degrees from one another.

34. The differential housing of claim 33 wherein said first and second notches extend axially away from one another.

35. The differential housing of claim 34 wherein said portions of said housing preform are disposed in both of said first and second notches.

36. A differential assembly comprising:
a differential gear assembly having a housing with a continuous wall and a pin extending through said housing;
a support member disposed in situ with respect to said housing; and
wherein said support member receives said pin and provides strength to said continuous wall by distributing pressure received from said pin evenly about said continuous wall.

37. The differential assembly of claim 36 wherein said support member further comprises:
at least one radial discontinuity for receiving a portion of said housing.

38. The differential assembly of claim 37 wherein said member is generally spherical.

39. The differential assembly of claim 38 wherein said substantially spherical member is truncated on opposite sides.

40. The differential assembly of claim 39 wherein said substantially spherical member is hollow.

41. The differential assembly of claim 40 wherein said substantially spherical member includes at least one radial discontinuity on said outer surface.

42. The differential assembly of claim 41 wherein said at least one radial discontinuity is a depression in said outer surface.

43. The differential assembly of claim 42 wherein said at least one radial discontinuity includes a first notch adjacent to one of said truncated sides and a second notch adjacent to the other of said truncated sides.

44. The differential assembly of claim 43 wherein said first and second notches are radially spaced from one another.

45. The differential assembly of claim 44 wherein said first and second notches are radially spaced 180 degrees from one another.

46. The differential assembly of claim 45 wherein said first and second notches extend axially away from one another.

* * * * *